(12) United States Patent
Kaneda (10) Patent No.: US 6,301,276 B1
(45) Date of Patent: *Oct. 9, 2001

(54) LASER LIGHT GENERATING APPARATUS

(75) Inventor: Yushi Kaneda, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/588,007

(22) Filed: Jan. 17, 1996

(30) Foreign Application Priority Data

Jan. 18, 1995 (JP) .................................................. 7-005425

(51) Int. Cl.$^7$ ........................................................ H01S 3/13
(52) U.S. Cl. .............................. 372/32; 372/21; 372/26; 372/27; 372/22
(58) Field of Search ................................. 372/21, 22, 75, 372/92, 27, 26

(56) References Cited

U.S. PATENT DOCUMENTS

| | | | |
|---|---|---|---|
| 4,386,428 | * 5/1983 | Baer | 372/22 |
| 4,791,631 | * 12/1988 | Baumert et al. | 372/22 |
| 4,897,562 | * 1/1990 | Krasinski et al. | 372/22 |
| 4,933,944 | * 6/1990 | McGraw | 372/22 |
| 5,060,233 | * 10/1991 | Harder et al. | 372/22 |
| 5,119,389 | * 6/1992 | Amano | 372/22 |
| 5,216,681 | * 6/1993 | St. Pierre et al. | 372/22 |
| 5,394,414 | * 2/1995 | Kozlovsky et al. | 372/22 |
| 5,408,481 | * 4/1995 | Scheps | 372/22 |
| 5,555,253 | * 9/1996 | Dixon | 372/100 |

* cited by examiner

Primary Examiner—Leon Scott, Jr.
(74) Attorney, Agent, or Firm—Ronald P. Kananen; Rader, Fishman & Grauer (57) ABSTRACT

A laser light generating apparatus capable of radiating a laser light of third harmonics of the fundamental light as a continuous light, is disclosed. The apparatus includes a first laser light source L1 employing an Nd:YAG laser as a laser medium as a laser light source radiating the continuous laser light of an infrared wavelength, a second laser light source L2 for resonating a laser light from a laser medium of Nd:YVO$_4$ within a resonator for generating second harmonics, as a laser light source radiating a continuous laser light of a green wavelength, and an external resonator 1 consisting of a set of mirrors. The outgoing lights are combined by additive frequency mixing by a phase-matched non-linear crystal element BBO 10 arranged within the external resonator 1 as the outgoing lights are synchronized and resonated simultaneously within the external resonator.

8 Claims, 5 Drawing Sheets

LASER LIGHT GENERATING APPARATUS

BACKGROUND OF THE INVENTION

This invention relates to a laser light generating apparatus for radiating a continuous light of a short wavelength based upon the outgoing light of a laser light source.

An optical recording medium is employed for recording/reproduction of data such as video or audio signals. Although a large quantity of data may be recorded on an optical recording medium, it is desirable for an optical recording medium to have a recording capacity much larger than the current recording capacity.

For realizing an optical recording medium of a larger recording capacity, it is required to raise the information recording density of the information recording medium. One of the techniques of increasing the recording density is to shorten the wavelength of the laser light employed for high density recording.

Recently, a demand has been raised for a laser light of the ultraviolet wavelength as a short wavelength laser light. In particular, the laser light of the ultraviolet wavelength in the vicinity of the wavelength of 355 nm is desired most strongly. For generating the laser light of this wavelength range, there is known a method of generating third harmonics of the infrared wavelength used as the fundamental wavelength.

If, for generating the third harmonics (THG) by a laser light radiating device, Nd:YAG or Nd:YVO$_4$, a solid laser, is employed as a laser medium, the laser light of the fundamental wave generated by exciting the laser medium by a light pumping method and the second harmonics produced on wavelength conversion of the fundamental laser light are frequency-mixed for generating the third harmonics of the fundamental laser light, that is the laser light in the vicinity of the wavelength of 355 nm within the UV range.

The laser light in the vicinity of the wavelength of 355 nm is a laser light generated with the pulse mode. The reason the THG incurs the mode of pulse oscillation is that, when the outgoing laser light of the fundamental wavelength is frequency-mixed with the second harmonics, the laser light of the third harmonics is generated by a single pass in which the laser lights are passed only once through a non-linear crystal. The result is that the non-linear conversion of third harmonics is limited to only one pass resulting in pulse oscillation of the laser light of third harmonics.

Since the laser light radiated in the vicinity of the wavelength of 355 nm is a pulsed light, such laser light is difficult to apply to optical recording or optical display where continuous light is necessitated.

As a method for raising the non-linear conversion efficiency by the continuous light by the laser light generating apparatus, there has been proposed a method of arranging a non-linear crystal within the light path of the light resonator.

This method achieves short harmonics generation (SHG) by using a resonator having high finesse and high transmittance for the light of the wavelength equal to one-half the fundamental wavelength and having suppressed losses in level at the fundamental wavelength.

However, for generating the third harmonics as the continuous light, the fundamental laser light wave with a frequency of 1 ω and the second harmonics laser light by SHG with a frequency of 2 ω need to be resonated at the time of additive frequency mixing of the two laser light beams. In addition, a mirror constituting the resonator needs to be of low reflection with respect to the third harmonics. Furthermore, wavelength dispersion of the resonator needs to be synchronized for resonating the fundamental wavelength light generated by the laser light source with the second harmonics within the same resonator.

OBJECT AND SUMMARY OF THE INVENTION

It is therefore an object of the present invention to provided a laser light generating apparatus in which the laser light of the third harmonics of the fundamental wavelength may be radiated as a continuous laser light.

The laser light generating apparatus according to the present invention includes a first laser light source employing an Nd:YAG laser as a laser medium, as a laser light source radiating the continuous laser light of an infrared wavelength, a second laser light source for resonating a laser light from a laser medium of Nd:YVO$_4$ within a resonator for generating second harmonics, as a laser light source radiating a continuous laser light of a green wavelength, and an external resonator consisting of a set of mirrors. The outgoing lights are combined by additive frequency mixing by a phase-matched non-linear crystal element BBO arranged within the external resonator as the outgoing lights are synchronized and resonated simultaneously within the external resonator.

The first laser light source has a wavelength of 1.05 to 1.07 μm.

As the laser medium producing the laser light with a wavelength of 1064 nm, LNP, YLF, GGG or YAP may be employed in place of Nd-YAG or Nd:YVO$_4$.

The second laser light source radiates second harmonics with a wavelength of λ/2, where λ is the wavelength of the first laser light source.

Specifically, the wavelengths of the outgoing lights of the first and second laser light sources are 1.064 μm and 0.532 μm, respectively.

The external resonator includes a mirror coated with a dielectric multi-phase layer and an input coupling mirror having reflectance appropriate for impedance matching. The dielectric multi-phase layer is formed by ion sputtering or ion plating. At least one of the mirrors of the external resonator is an output mirror having wavelength characteristics of transmitting the continuous light produced on additive frequency mixing. The input coupling mirror is used simultaneously as an output mirror.

The first laser light source and the second laser light source are provided with the wavelength controlling function of controlling the wavelength of the outgoing light.

Preferably, the external resonator is synchronized with the outgoing light from one of the first laser light source and the second laser light source by controlling its optical path length, and is also synchronized with the outgoing light from the other light source by controlling the oscillation wavelength of the outgoing light from the other light source.

As a light source having a phase modulator within at least one of the first laser light source and the second laser light source, it is possible to use the laser light from an injection synchronization laser light source or an external laser light source configured for producing second harmonics and to use the frequency sideband of one of the light sources for synchronization with the external resonator.

The non-linear optical crystal element arranged within the external resonator has a surface coating designed for lowering the reflectance at the wavelength of the outgoing lights from the first and second laser light sources.

As the non-linear optical crystal element, β-barium borate (BBO) crystal, for example, may be employed. The crystal may be cut at an angle θ=31.3°, or the angle the main crystal axis makes with the optical axis may be set to 38.6° or 59.7° for meeting the type I or type II phase matching conditions for generating an outgoing light by additive frequency mixing.

As the non-linear optical crystal element, periodically poled lithium niobate (PPLN) may be employed. With PPLN, the poling period is set to an odd-number multiple of 1.9 μm or 3.6 μm and pseudo-phase matching conditions are met using the lights of the wavelength of 1.06 μm and 0.53 μm for generating an outgoing light by additive frequency mixing.

The external resonator is preferably configured so that the outgoing lights radiated from the two light sources, at least one of which is the S-polarized light, are resonated by at least three mirrors provided in the same plane.

Preferably, an even number of mirrors is provided for providing an arrangement invulnerable against disturbances.

The laser light generating apparatus includes a beam splitter for spatially splitting the reflected light and the lights of the two incident light components on the external resonator contained in the reflected light in dependence upon wavelength dependency, and a light receiving element for receiving the light of the incident light component separated by the beam splitter. The signal obtained from the light receiving element is employed for effecting control satisfying simultaneous resonance. As this beam splitter, a dichroic mirror, for example, may be employed.

The laser light generating apparatus includes a light receiving element for detecting the light of two incident light components on the external resonator contained in the reflected light from the external resonator, and a band-pass filter for electrically frequency discriminating the output signal from the light receiving element for passing only the pre-set frequency component. The pass band of the band-pass filter is selected so that one of the output frequencies is not an integer number multiple of the remaining frequency.

The laser light generating apparatus may be provided with an anamorphic prism for beam shaping the reflected generated light from the external resonator.

With the laser light generating apparatus of the present invention, the fundamental laser light of continuous wave produced separately from the first laser light or the second laser light is incident on the external resonator for synchronization with at least one light source, and the oscillation wavelength of the remaining light source is controlled for synchronization. The fundamental light and the second harmonics having the wavelength equal to one-half the wavelength of the fundamental light are resonated in the same resonator for efficiently producing continuous light of third harmonics by additive frequency mixing by a common mirror configuration.

DESCRIPTION OF THE PREFERRED EMBODIMENTS

Figure 1:
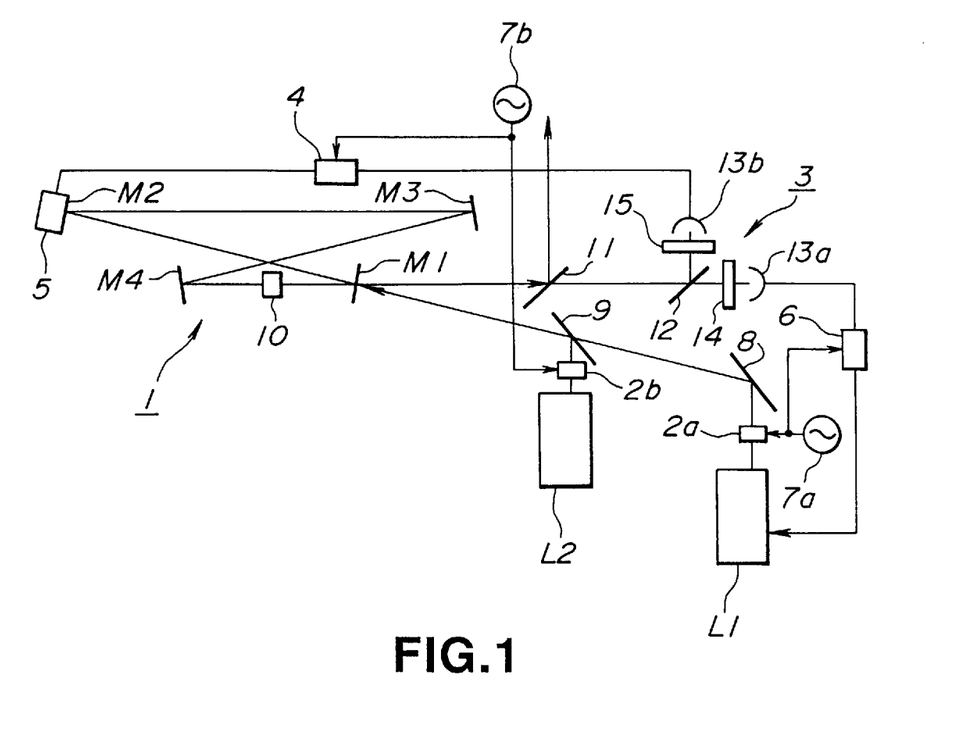
FIG. 1 schematically illustrates a laser light generating apparatus according to the present invention.

The laser light radiating apparatus according to the present invention includes two laser light sources L1, L2, an external resonator 1 for capturing and resonating the laser light beams radiated by the laser light sources L1 and L2, phase modulators 2a, 2b for phase modulation of the outgoing laser light beams from the laser light sources L1 and L2 and a photodetector 3 for detecting the reflected light from the external resonator 1. The laser light generating apparatus also includes a resonator length controller 4 for controlling the length of a cavity within the external resonator 1 by an output of the photodetector 3, an electromagnetic actuator 5 for shifting a mirror along the optical axis responsive to the driving signals from the controller 4 and a wavelength controller 6 for controlling the wavelength of the laser light incident on the external resonator 1 from the laser light source L1.

The laser light source L1, which is a light source radiating a continuous laser light of a first wavelength, includes e.g., an Nd:YAG excited by a semiconductor laser, and generates a fundamental wave of a sole frequency with a wavelength of 1064 nm. The laser light source L1 may be frequency-controlled by external control.

The laser light source L2, a light source radiating a continuous laser light of a second wavelength, radiates a green laser light by exciting by/with a semiconductor laser. Specifically, by employing e.g., Nd:YVO$_4$ as a laser medium, and by generating the second harmonics with respect to the fundamental wave radiated by the laser medium within the resonator, a stable green laser light by semiconductor laser excitation, having a single frequency corresponding to one-half the wavelength of the fundamental laser light from the laser light source L1, that is the wavelength 532 nm of the second harmonics, is produced. However, the laser light source L2 does not have the frequency controlling function.

On the optical axes of the laser light beams radiated from the laser light sources L1 and L2 are arranged phase modulators 2a, 2b, respectively. As the phase modulators 2a, 2b, electro-optical (EO) elements or acousto-optical (AO) elements are employed. The phase modulator 2a is fed from a driver (driving circuit) with a modulation signal, such as with a frequency fm =10 MHz, for driving from an external oscillator 7a. Using the modulating signal, the phase modulator 2a phase-modulates the laser light with a wavelength of 1064 nm. The phase modulator 2b similarly phase modulates the laser light with a wavelength of 532 nm with the aid of the modulation signal from an external oscillator 7b.

By employing a technique of matching the sideband phase shift and reflected by the resonator after such phase modulation for both fundamental waves, the two fundamental waves may be positioned at the center of the mode of resonation, such that the totality of the incident light may be caused to be incident within the external resonator 1. The technique of frequency control within the resonator is disclosed in, for example, R. W. P. Drever et al., "Laser Phase and Frequency Stabilization Using an Optical Resonator", Applied Physics B 31.97-105 (1983).

The laser light transmitted through the phase modulator 2a is reflected by a mirror 8 configured for reflecting the laser light radiated from the laser light source L1 to the external resonator 1 via a beam splitter 9 as later explained. The laser light radiated by the laser light source L2 is also transmitted via the phase modulator 2b to the beam splitter 9.

The optical properties of the beam splitter 9 are selected so that the incident laser light with the wavelength of 532 nm and the incident laser light with the wavelength of 1064 nm are reflected and transmitted, respectively.

The relative position of the phase modulator 2b and the beam splitter 9 is selected so that an output light of the laser light source L2 is superimposed on an output light of the laser light source L1, that is so that the optical axes of the two output lights coincide with each other. The output lights of the laser light sources L1, L2 via the beam splitter 9, thus confounded with each other, are incident on a mirror M1 of the external resonator 1.

Although not shown, an optical system between the beam splitter 9 and the mirror M1 of the external resonator 1 is selected to be spatially matched on the downstream side to the intrinsic mode of the external resonator 1 made up of the mirrors M1 to M4.

The external resonator 1, made up of the four mirrors M1 to M4, is configured for generating the ultraviolet light of a wavelength of 355 nm, which is the third harmonics with respect to the fundamental wavelength of 1064 nm, by additive frequency mixing of the two incident fundamental waves.

The external resonator 1 effects wavelength conversion within the resonator using type I phase matching conditions. That is, the two fundamental wavelength laser lights are adjusted so that these two laser lights are perpendicular to the drawing sheet, that is the laser lights become S-polarized lights with respect to the mirrors. By employing the S-polarized light, the reflectance of each mirror may be higher than in the case of employing the P-polarized light, thus suppressing the loss incurred within the external resonator 1.

The mirror M1 is an input-coupling mirror to which two laser lights from the laser light sources L1, L2 are incident to the external resonator 1 simultaneously along the same optical axis. Thus the mirror M1 is an output mirror for outputting the reflected light of the third harmonics produced on additive frequency mixing and is actually a concave mirror having the radius of curvature equal to 30 mm.

The mirror M1 is coated with a multi-layer dielectric film for impedance matching. The multi-layer dielectric film, produced by e.g., ion sputtering or ion plating for fabrication of a high-quality mirror, may also be formed by methods other than the ion sputtering or ion plating.

Figure 2:
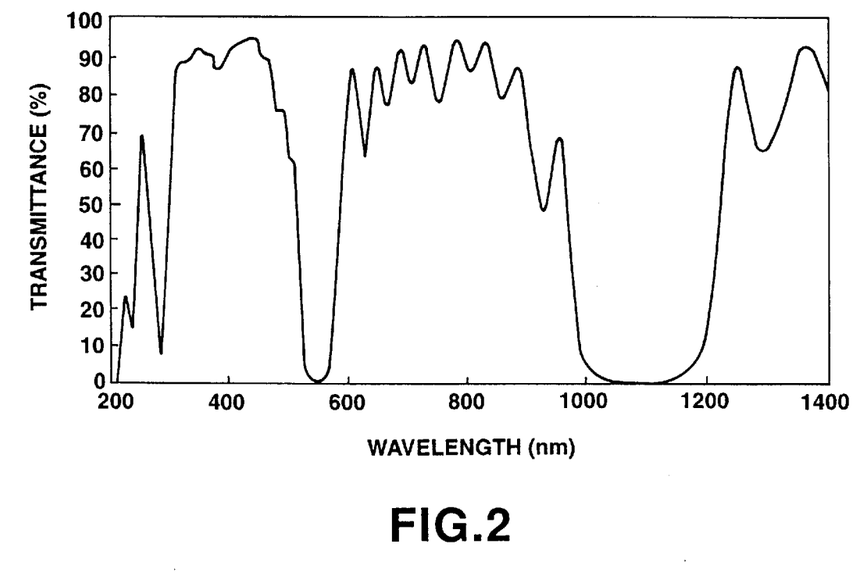
FIG. 2 is a graph showing the transmission spectrum of a mirror M1 of the laser light generating apparatus shown in FIG. 1.

By coating the mirror M1 with a multi-layer dielectric film, the transmission spectrum as shown for example in FIG. 2 is produced. It is seen from FIG. 2 that, since the light transmittance is about 1% or higher for the wavelength of 1064 nm of the first continuous wave laser light and for the wavelength of 532 nm of the second continuous wave laser light, the mirror M1 is highly reflective with respect to the two wavelengths. On the other hand, since the mirror M1 has the light transmittance as high as 90% for the wavelength of 355 nm of the third harmonics of the fundamental light, the reflected light of the third harmonics generated within the external resonator 1 is transmitted and outputted via the mirror M1.

The other three mirrors M2 to M4 are dual wavelength high reflectance mirrors (dual HR mirrors). These two wavelength mirrors M2 to M4 are highly reflective with respect to these two wavelengths.

The mirrors M2, M3 are plane mirrors, while the mirror M4, similarly to the mirror M1, is a concave mirror with the radius of curvature of 30 mm.

In the external resonator 1, the distance between the mirrors M4 to M1 is on the order of 32 mm. The intrinsic mode of the external resonator 1 has a small-sized spot between the mirrors M4 and M1. The external oscillator 1 constitutes a ring-shaped oscillator in which the light path between the mirrors M4 and M1 is substantially the same plane.

The mirror M2 is mounted on the electromagnetic actuator 5 employed for precise positioning. The position of the mirror M2 is finely controlled by the electromagnetic actuator 5 responsive to the resonator length controlling signal supplied from outside. The electromagnetic actuator 5 has the function of controlling the resonation frequency. The manner of controlling the resonator length will be discussed subsequently.

Within the external resonator 1 is mounted a non-linear optical crystal element 10 formed e.g., of β-barium borate (BBO).

The BBO 10 is cut so that the angle with respect to the C-axis in the crystal is approximately 31.3°. The coating on the BBO 10 is selected so that the BBO becomes non-reflecting with respect to both the wavelengths of 1064 nm and 532 nm of the fundamental laser light incident on the external resonator 1.

The BBO 10 is arranged substantially partway between the mirrors M4 and M1. The plane resonator, made up of the mirrors M4 and M1, is supplied with incident light beams having two wavelengths as the S-polarized light. The BBO 10 is arranged so that the direction of light polarization by S-polarization at the spot position of the incident light is coincident with that of the natural polarization of the BBO 10. The coincidence of the directions of light polarization means that the direction of the normal light of the BBO 10 is coincident with the direction of S-polarization of the incident light.

Since the power density of incident light on the BBO 10 is increased, even if the power within the external resonator 1 is constant, it becomes possible to improve the non-linear conversion efficiency of the external resonator 1.

The degree of strengthening by resonation depends upon the loss within the resonator, that is upon light scattering, transmission and absorption occurring in each mirror, light scattering, absorption and reflection losses on the crystal plane of the non-linear optical crystal element and upon light scattering and absorption within the crystal. That is, the lesser the loss of a resonator, the higher becomes the resonation strength. Thus, by coating the mirrors M2 and M3 with a film of low losses by, for example, ion sputtering, it becomes possible to improve the power of the generated third harmonics.

In effect, the mirrors M2 and M3 are required to have reflectance not less than 99.9%. The reflectance of the mirror actually employed was on the order of 99.7 to 99.8%. If the fundamental laser light of approximately 200 mW with a wavelength of 1064 nm and the fundamental laser light of approximately 100 mW with a wavelength of 532 nm are incident on the external resonator 1 under the above mirror conditions, third harmonics of approximately 2 mW with a wavelength of 355 nm are produced.

If the mirror M3 is a low-loss mirror, the third harmonics of approximately 10 mW with a wavelength of 355 nm is produced. Also, if the mirror M2, mounted on the electromagnetic actuator 5, is also a low-loss mirror, and the incident light is the fundamental laser light of approximately 300 mW with the wavelength of 532 nm, the third harmonics of approximately 10 mW with a wavelength of 355 nm is produced.

Thus, with the external resonator 1, the third harmonics laser light of continuous light may be produced by additive frequency mixing of the two incident fundamental laser lights.

The reflected light from the external resonator 1 is incident on a beam splitter 11, the optical properties of which are set for reflecting the laser light with the wavelength of 355 nm of the incident light and for directly transmitting the laser lights of the wavelengths of 1064 nm and 532 nm.

The light beam of the third harmonics, reflected so that its optical path is bent 90°, is occasionally subjected to elongated distortion by the walk-off effect. This distortion may be corrected by a beam shaping optical element, such as an anamorphic prism or a cylindrical lens, placed on the optical axis of the light beam of the third harmonics.

The lights containing the lights of the wavelengths of 1064 nm and 532 nm, transmitted through the beam splitter 11, are incident on a beam splitter 12, the optical properties of which are set for reflecting and transmitting the light with the wavelength of 532 nm and the light with the wavelength of 1064 nm, respectively.

The photodetector 3 of the laser light generating apparatus has a light receiving element 13a on the optical axis of the light with the wavelength of 532 nm reflected by the beam splitter 12, and a light receiving element 13b on the optical axis of the light with the wavelength of 1064 nm. For providing detection signals from the light receiving elements 13a, 13b with wavelength selectivity, a filter 14 for absorbing the infrared light and a filter 15 for absorbing the green light are arranged between the light receiving element 13a and the beam splitter 12 and between the light receiving element 13b and the beam splitter 11, respectively.

With the above arrangement, the laser light with the wavelength of 1064 nm and the laser light with the wavelength of 532 nm are not incident on the light receiving elements 13a and 13b, respectively, so that there is no risk of unneeded crosstalk in the light receiving elements 13a or 13b.

The light receiving elements 13a, 13b detect signals containing the information on phase changes brought about by reflection in the resonator of the sideband phase modulated by the phase modulators 2a and 2b after photoelectric conversion as described above. The signals thus detected by the light receiving elements 13a, 13b are supplied to the resonator length controller 4 and to the wavelength controller 6, respectively.

The resonator length controller 4 and the wavelength controller 6 each have a mixing function, and are fed with modulation signals from external oscillators 7a, 7b, respectively. These modulation signals are wave-shaped or phase-delayed, if so desired. The resonator length controller 4 and the wavelength controller 6 perform synchronous detection by multiplication of the detection signals with the modulation signals. The resonator length controller 4 and the wavelength controller 6 find the deviation between the resonant frequency of the external resonator 1 and the light frequencies of the laser light sources L1 and L2, respectively.

The resonator length controller 4 transmits the deviation produced by transmitting the synchronously detected output signal via a low-pass filter to a driver driving the electromagnetic actuator 5 as an error signal. This driver effects servo control of shifting the reflecting surface of the mirror M2 of the external resonator 1 in a direction along the optical axis by a driving signal by the electromagnetic actuator 5 along the optical axis for reducing the error signal to zero.

This allows synchronization of the output light from the laser light source L1 controlled to be suited to the resonator length of the external resonator 1 and continued resonation of the output light of the laser light source L1 within the external resonator 1.

The laser light of the laser light source L2 with a frequency fc is phase-modulated with a frequency fm by the phase modulator 2b so that a sideband fc[]fm is set. The wavelength controller 6 detects the beat between the frequency fc and fc±fm of the light from the external resonator 1 with the resonant frequency fo for generating an error signal having a polarity.

In effect, the original modulation signal having a suitable phase with respect to the modulation signal component in a mixer is multiplied with the detection signal from the light receiving element 13a for synchronous detection and the modulation carrier component is eliminated by e.g., a low-pass filter for producing the error signal. The wavelength controller 6 transmits the error signal as the frequency control signal to the laser light source L2 for servo control. By this control, the output of the laser light source L2 is synchronized with the frequency of the external resonator 1.

In this manner, the two laser light sources L1, L2 are synchronized simultaneously. Thus the two fundamental continuous laser lights are circulated in the external resonator 1 simultaneously. Within the external resonator, these two fundamental continuous laser lights, which may be strengthened in intensity by resonation, are incident on the BBO 10 to produce continuous laser light of third harmonics by additive frequency mixing for raising the conversion efficiency.

Figure 3:
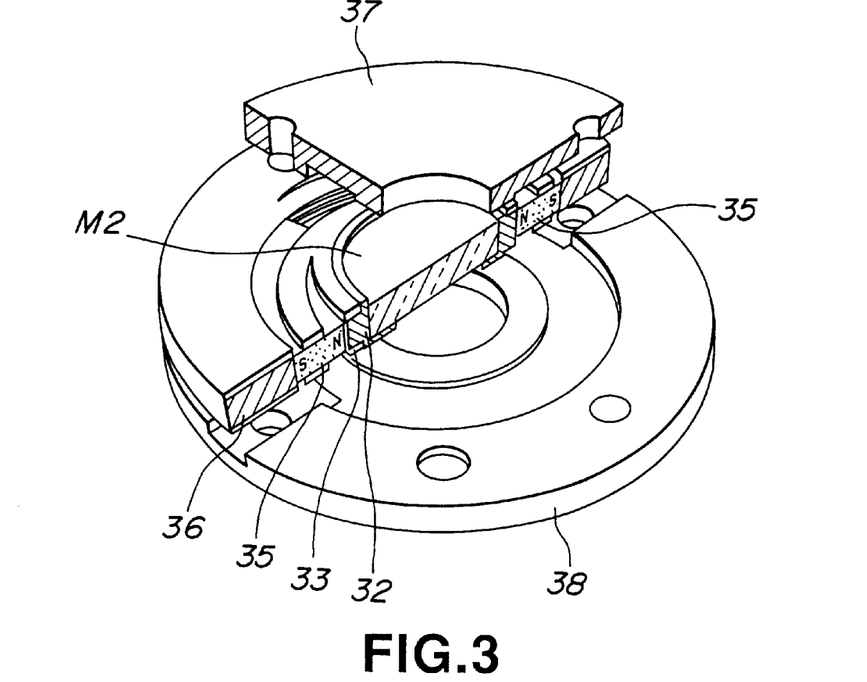
FIG. 3 is a schematic perspective view of a portion of an electro-magnetic actuator of the laser light generating apparatus shown in FIG. 1.
Figure 4:
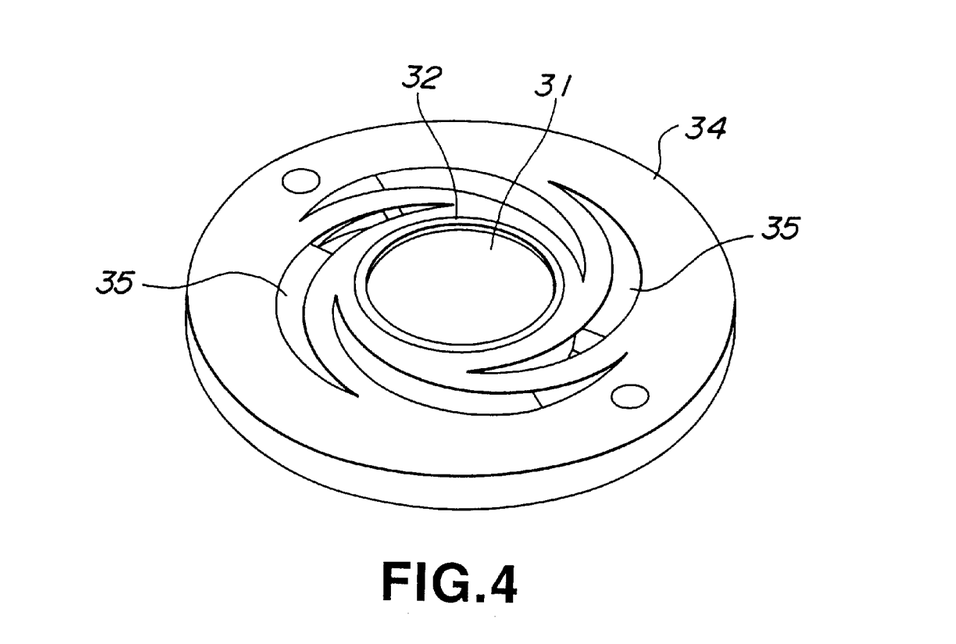
FIG. 4 is a schematic perspective view showing a helical plate spring of electromagnetic actuator of the laser light generating apparatus shown in FIG. 1.

Reference is had to FIG. 3 showing an illustrative construction of the electromagnetic actuator 5 and to FIG. 4 showing a spiral spring plate.

The mirror M2 is securely fitted to s coil bobbin 32 formed as a ring-shaped or cylindrical ceramic insulator. Around the coil bobbin 32 is fitted a coil (so-called voice coil) in the form of a solenoid. This coil bobbin 32 is fitted on a spirally-shaped spring plate 33 shown for example in FIG. 4. This spring plate 33 is securely supported by a magnet 35 on a ring-shaped yoke 36. The magnet 35 is arranged for surrounding the cylindrical coil 33 of the coil bobbin 32. The magnet 35 has its inner and outer peripheral sides magnetized to N and S poles, respectively. The magnet 35 has its outer peripheral side secured, such as by adhesion, to the yoke 36 of a magnetic material, such as iron. The spring plate 33 is secured, such as by adhesion, to the upper and lower sides of the coil bobbin 32, while having its outer periphery supported by the yoke 36. These components are sandwiched in their entirety between shielding plates 37, 38 of a magnetic material, such as iron. These shielding plates 37, 38 as well as the yoke 36 perform the function of the return magnetic path for the magnetic flux from the magnet 35. The entire components are surrounded by these shield plates for facilitating the handling.

It is possible with the above-described electromagnetic actuator 5 to achieve a larger driving force along the optical axis and transmission characteristics with little phase deviation because the magnetic circuit is formed substantially as a closed magnetic path despite the fact that no electrically conductive component nor magnetic components are arranged on the inner side of the coil 33. By using ceramics as the material for the coil bobbin 32, the dual resonant frequency not lower than 100 kHz may be achieved.

By constructing the laser light generating apparatus in this manner, a continuous laser light may be produced which may be employed in a wider range of application than that achievable with pulsed third harmonics produced from the fundamental laser light.

Since the main point of the present invention resides in dual resonation of the fundamental laser lights from the laser light sources L1, L2 by the external resonator 1, the external resonator need not necessarily be synchronized with one of the fundamental laser lights provided both of the two fundamental laser lights have the frequency control function. It is only sufficient if the frequency of each of the two fundamental laser lights is synchronized with the resonant frequency of the external resonator 1.

The generating apparatus for a master laser light, employed as a frequency-controllable laser light source in the present invention, may be an injection synchronous laser light generating apparatus for radiating the injection-synchronized laser light or a laser light generating apparatus having an external resonator within the laser light source.

The injection synchronous laser light generating apparatus radiates a continuous fundamental laser light associated with e.g., the laser light source L1, while the laser light generating apparatus having the external resonator radiates the continuous laser light of second harmonics by the external resonator in association with the laser light source L2. As the laser light sources L1 and L2, one or both of the injection synchronous laser light generating apparatus and the laser light generating apparatus having the external resonator may also be employed.

The injection synchronous laser light generating apparatus amplifies an input signal, having a frequency close to the self-running frequency of the laser oscillating apparatus, to a laser light of larger amplitude and the same frequency as the input signal, by exploiting the phenomenon in which the oscillation frequency of the laser generating apparatus is captured to the input signal frequency.

Figure 5:
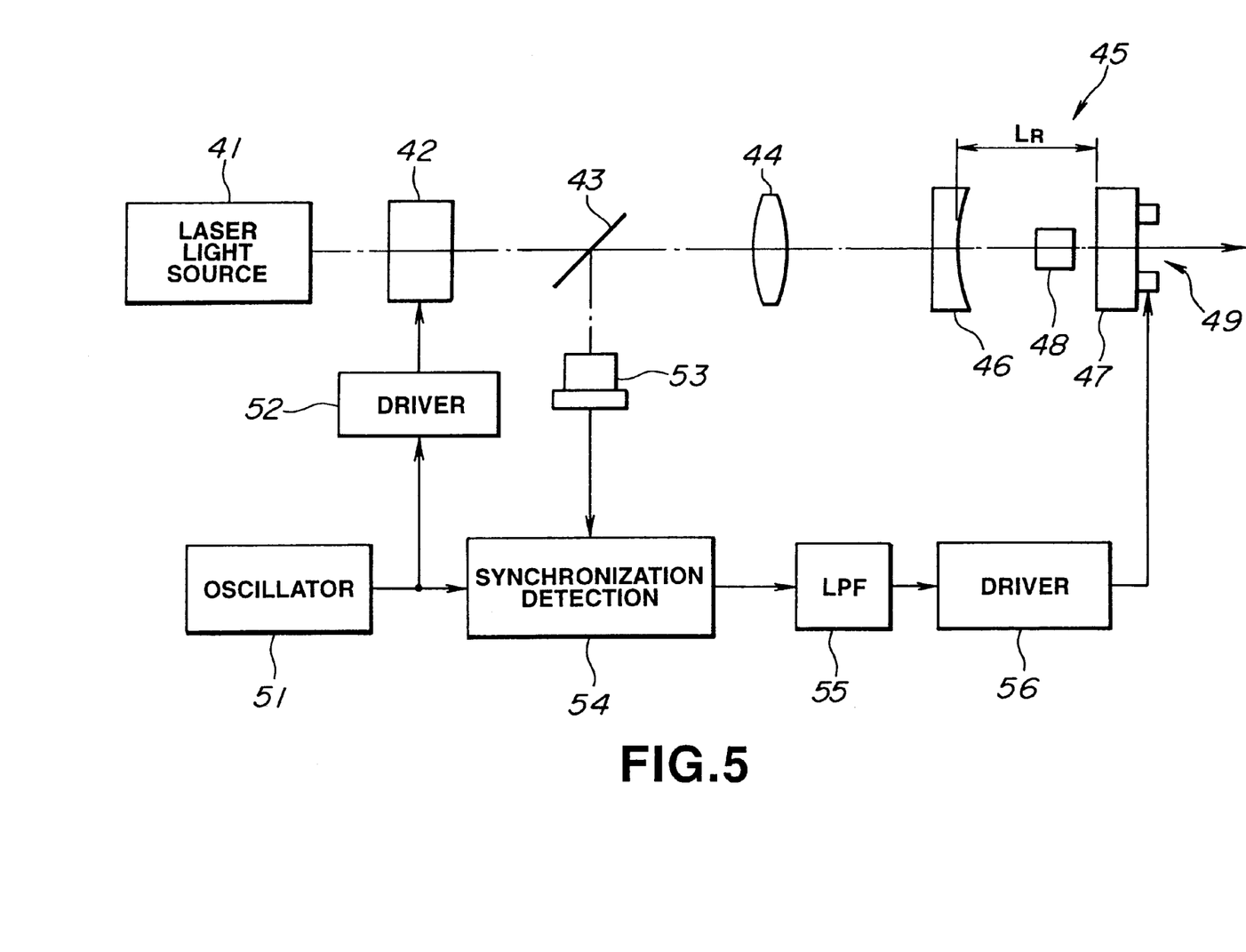
FIG. 5 schematically illustrates the construction of an injection synchronization laser applied to the laser light generating apparatus according to the present invention.

Referring to a schematic arrangement shown in FIG. 5, an illustrative construction of the injection synchronous laser light generating apparatus employed as the laser light source L2 is explained.

The laser light source L2 has a laser light source 41 for radiating the fundamental laser light configured for generating second harmonics. The fundamental laser light from the laser light source 41 is phase-modulated by a phase modulator 42 and is incident on an external resonator 45 via a reflecting surface 43 for detecting the reflected light of the resonator and a light condensing lens 44.

The external resonator 45 has a non-linear optical crystal element 48 between the reflecting surface of the concave mirror 46 and the reflecting surface of the plane mirror 47. Resonation occurs when the length of an optical path $L_R$ between the reflecting surfaces of a pair of concave mirrors 46 and the reflecting surface of the plane mirror 47 is of a preset length such that the optical path phase difference $\Delta$ becomes equal to an integer number times $2\pi$, with the reflectance and the phase of reflection being significantly changed in the vicinity of the resonance phase. One of the reflecting surfaces 46 and 47 of the resonator 45, such as the reflecting surface 47, is driven in the direction of the optical axis by an electro-magnetic actuator 49.

An oscillator 51 outputs a modulation signal for driving the phase modulator 43. These modulation signals are transmitted to a driver 52. The reflected light of the laser light sent to the resonator 45 is detected via the reflecting surface 43 by a photodetector 53 so as to be sent as a reflected light detection signal to a synchronous detection circuit 54.

The synchronous detection circuit 54 is fed with modulated signals from an oscillator 51 and multiplied by the reflected light detection signal in order to perform synchronous detection. The detection signal of the synchronous detection circuit 54 becomes an error signal for the optical path length of the oscillator via an LPF 55. This error signal becomes a driving signal for the electro-magnetic actuator 49. The electromagnetic actuator 49 is responsive to this driving signal to shift the reflecting surface 17 along the optical axis for reducing the error signal to zero by way of performing servo control of controlling the resonator length.

If, with the above construction, the frequency of the input signal to the injection synchronous laser light generating device is controlled to be set to the resonance frequency of the external resonator 1, the phase modulation provided only to a master laser incident on the external resonator 1 may be directly employed as a signal source for synchronization with the external resonator 1 configured for performing additive frequency mixing. That is, the phase modulation provided to the master laser for injection synchronization may be used in place of the phase modulator 2a configured for phase modulating the output light of the laser light source L1 for synchronizing the phase modulation with respect to the external resonator 1 without employing the phase modulator 2b or the oscillator 7b.

The fundamental laser light may also be radiated to the external resonator 1 by employing an arrangement comprising synchronizing SHG with another external resonator for effecting phase modulation as in the case of the laser light generating apparatus having the external resonator without employing the phase modulator 2b or the oscillator 7b.

By employing the injection synchronous laser light generating device and the laser light generating apparatus fitted with the external resonator as one or both of the laser light sources L1 and L2 as the master laser, it becomes possible to raise the output of the third harmonics of continuous laser light from the external resonator 1 and hence to provide a high output of the reflected light from the external resonator 1.

The relation between the phase matching condition and the non-linear optical crystal is briefly explained.

With the non-linear optical crystal element, arranged within the external resonator 1, THG is carried out based upon type I phase matching conditions by employing a BBO 10 cut at an angle of about 31.3°. The phase matching condition is not limited to type I, such that the phase matching conditions of type II may also be employed for generating the additive frequency light of the continuous fundamental light of 1064 mm and the continuous fundamental light of 532 mm by setting the cutting angle of the crystal of the BBO 10 to about 38.6° or to about 59.7°.

By setting the cutting angle of the non-linear optical crystal element in this manner, the phase matching conditions for THG may be selected for raising the degree of freedom in THG.

The non-linear optical crystal element is not limited to BBO and periodically poled lithium niobate (PPLN) may also be employed. The poling period actually required is an odd number multiple of about 1.9 $\mu$m or about 3.6 $\mu$m in case of interaction employing the non-linear optical coefficient $d_{33}$ or $d_{31}$, respectively.

If the PPLN is arranged within the external resonator 1, pseudo phase matching may be achieved. The non-linear conversion efficiency may be improved because of the high non-linear optical coefficient as the material constant. The conditions of the film-forming process may be alleviated by raising the non-linear conversion within the external resonator 1 for lowering the optimum reflectance of the mirror M1 as the input coupling mirror.

With the use of the PPLN, an output light having substantially the circular beam pattern is produced since there is no walk-off in the reflected light from the external resonator 1. This enables size reduction of the laser generating apparatus since no beam-shaping optical components need to be provided in the laser light generating apparatus and hence the number of the component parts may be diminished.

As a laser medium for generating the laser light having the wavelength of 1064 mm, LNP, YLF, GGG or YAP may also be employed in addition to Nd:YAG or Nd:YVO$_4$.

Figure 6:
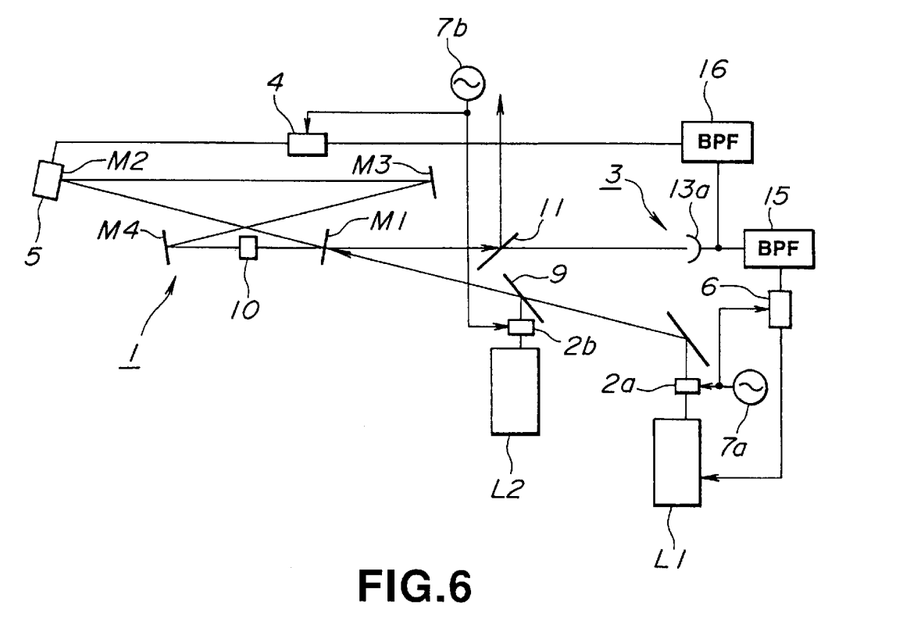
FIG. 6 schematically illustrates the construction of a modification of the laser light generating apparatus shown in FIG. 1.

Referring to FIG. 6, a modification of the laser light generating apparatus is explained. The same components as those used in the previous embodiment are denoted by the same numeral and the corresponding description is not made for clarity.

The laser light generating apparatus includes a light receiving element 13a for receiving the light reflected from the external resonator 1 and transmitted through the beam splitter 11, and band-pass filters (BPFs) 15, 16 for electrical carrier frequency discrimination of detection signals obtained on photoelectric conversion by the light receiving element 13a, as shown for example in FIG. 6.

The laser light generating apparatus performs resonation control such that the output lights of the laser light sources Li and L2 are phase modulated by the phase modulators 2a, 2b with different frequencies so that the output lights undergo simultaneous resonation on the same optical axis within the external resonator 1. Thus, a portion of the reflected light of the external resonator 1 is transmitted via the beam splitter 11 to the light receiving element 13a. The light sent to the light receiving element 13a contains the lights with the wavelengths of 1064 mm and 532 mm. The light receiving element 13a performs photoelectric conversion on the received light containing the lights of these wavelengths and sends corresponding detection signals to the BPFs 15 and 16, respectively.

The BPF 15 performs frequency selection so that the frequency band passed through the BPF 15 is not an integer number multiple of the frequency band passed by the BPF 16. By selecting the frequency in this manner, signals of harmonic distortion of the BPFs 15 and 16 may be prohibited from being overlapped thus enabling detection of signals of various wavelengths. This makes it possible to avoid cross-talk of detection signals otherwise produced in the two wavelengths.

The signals passed through the BPF 15 are transmitted to the resonator length controller 4, while the signals passed through the BPF 16 are transmitted to the wavelength controller 4. The resonator length controller 4 and the wavelength controller 6 output the resonator length control signal and the frequency control signal to the electromagnetic actuator 5 and to the laser light source L1, respectively.

By the above arrangement, the beam splitter 12 may be eliminated, while only one light receiving element 1 suffices, thus enabling the number of component parts to be diminished.

What is claimed is:

1. A laser light generating apparatus comprising:
    a first light source for radiating a first continuous laser light of a first wavelength;
    a second light source for radiating a second continuous laser light of a second wavelength different from said first wavelength;
    an optical resonator for allowing the first and second laser lights radiated by said first and second light sources to be oscillated in resonance simultaneously and mixed by additive frequency mixing for generating a third continuous laser light of a third wavelength, said resonator comprising a non-linear optical crystal element,
    wherein said resonator comprises an input coupling mirror on which said first and second laser lights are incident, wherein said input coupling mirror transmits light of said first and second wavelengths into said resonator, but reflects light of said first and second wavelengths within said resonator and transmits light of said third wavelength;
    a combining element that combines said first and second laser lights before inputting said first and second laser lights to said resonator;
    a first optical separator that is optically coupled to said resonator and that separates from the light output by said resonator a light component having said third wavelength;
    a second optical separator that separates light of said first wavelength and separates light of said second wavelength out of the light output by said resonator;
    a first light detector that detects said separated light of said first wavelength;
    a first controller that controls said first wavelength of said first light source by providing a frequency control signal to said first light source in response to said light detected by said first light detector;
    a second light detector that detects said separated light of said second wavelength; and
    a second controller that controls resonation by adjusting a length of an optical path in said resonator in response to said light detected by said second light detector.

2. The laser light generating apparatus as claimed in claim 1, wherein said input coupling mirror comprises a dielectric, multiphase coating.

3. The laser light generating apparatus as claimed in claim 1, wherein at least one of the first and second light sources has phase modulation means for phase modulating the radiated laser light.

4. The laser light generating apparatus as claimed in claim 1, wherein said resonator comprises a plurality of optically coupled mirrors for resonating laser light to said resonator from the first and second light sources.

5. The laser light generating apparatus as claimed in claim 4, wherein said resonator further comprises a nonlinear optical crystal element optically coupled to an optical output of said plurality of optically coupled mirrors.

6. The laser light generating apparatus as claimed in claim 5, wherein said light resonated by said plurality of optically coupled mirrors is S-polarized by the resonator and the nonlinear optical crystal element in said resonator is configured to have a direction of inherent polarization consistent with said S-polarization of said light.

7. The laser light generating apparatus as claimed in claim 1, wherein said second controller controls said resonator by adjusting a distance between at least two mirrors of a plurality of optically coupled mirrors provided in said resonator.

8. A laser light generating apparatus comprising:

a first light source for radiating a first continuous laser light of a first wavelength;

a second light source for radiating a second continuous laser light of a second wavelength different from said first wavelength;

an optical resonator for allowing the first and second laser lights radiated by said first and second light sources to be oscillated in resonance simultaneously and mixed by additive frequency mixing for generating a third continuous laser light of a third wavelength, said resonator comprising a nonlinear optical crystal element, wherein said resonator comprises an input coupling mirror on which said first and second laser lights are incident, wherein said input coupling mirror transmits light of said first and second wavelengths into said resonator, but reflects light of said first and second wavelengths within said resonator, and transmits light of said third wavelength;

a combining element that combines said first and second laser lights before inputting said first and second laser lights to said resonator;

an optical separator that is optically coupled to said resonator and separates from the light output by said resonator a light component having said third wavelength;

light receiving means that receives a light component having said first wavelength and a light component having said second wavelength;

filter means for frequency discriminating an output of said light receiving means for allowing passage only of a preset frequency component;

a first controller that controls the first wavelength of said first light source by providing a frequency control signal to said first light source in response to said light component having said first wavelength received by said light receiving means; and a second controller that controls resonation by adjusting a length of an optical path in said resonator in response to said light component having said second wavelength being received by said light receiving means.

* * * * *